United States Patent
Minjeur et al.

(10) Patent No.: US 11,807,187 B1
(45) Date of Patent: Nov. 7, 2023

(54) MAGNETIC SEAT BELT ALIGNMENT

(71) Applicant: GM GLOBAL TECHNOLOGY OPERATIONS LLC, Detroit, MI (US)

(72) Inventors: Patrick Minjeur, Sterling Heights, MI (US); James L Benigni, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/943,460

(22) Filed: Sep. 13, 2022

(51) Int. Cl.
 *B60R 22/18* (2006.01)
 *B60R 22/48* (2006.01)

(52) U.S. Cl.
 CPC .............. *B60R 22/18* (2013.01); *B60R 22/48* (2013.01); *B60R 2022/1818* (2013.01); *B60R 2022/4816* (2013.01)

(58) Field of Classification Search
 CPC ...... B60R 22/18; B60R 22/48; B60R 2022/48
 See application file for complete search history.

(56) References Cited

U.S. PATENT DOCUMENTS

| | | | | |
|---|---|---|---|---|
| 5,915,286 A | * | 6/1999 | Figi | B60R 22/48 |
| | | | | 73/865.9 |
| 11,160,330 B1 | * | 11/2021 | Tseng | A44B 11/258 |
| 2004/0227626 A1 | * | 11/2004 | Almaraz | B60R 22/48 |
| | | | | 340/457.1 |
| 2005/0204523 A1 | * | 9/2005 | Smith | A44B 11/2576 |
| | | | | 24/633 |
| 2009/0243892 A1 | * | 10/2009 | Cheung | A44B 11/2569 |
| | | | | 340/945 |
| 2021/0206337 A1 | * | 7/2021 | Rivera | B60R 22/48 |

FOREIGN PATENT DOCUMENTS

| | | | | | |
|---|---|---|---|---|---|
| CN | 115707408 A | * | 2/2023 | ......... | A44B 11/2503 |
| DE | 10217227 C1 | * | 5/2003 | ............ | B60R 22/48 |
| WO | WO-0010418 A1 | * | 3/2000 | ....... | B60R 21/01516 |
| WO | WO-2019193166 A1 | * | 10/2019 | ......... | A44B 11/2526 |
| WO | WO-2020061188 A1 | * | 3/2020 | ......... | A44B 11/2503 |
| WO | WO-2022056585 A1 | * | 3/2022 | ....... | B60R 21/01516 |

\* cited by examiner

*Primary Examiner* — Paul N Dickson
*Assistant Examiner* — Matthew D Lee
(74) *Attorney, Agent, or Firm* — CANTOR COLBURN LLP (57) ABSTRACT

A seatbelt having a receiver having an opening configured to receive a latch-plate, an extended pushbutton at least partially disposed within the receiver, and a magnet at least partially disposed within the extended pushbutton, wherein the magnet is configured to align the latch-plate with the opening.

11 Claims, 7 Drawing Sheets

MAGNETIC SEAT BELT ALIGNMENT

INTRODUCTION

The disclosure relates to seatbelts. More specifically, the disclosure relates to a seatbelt having a magnetic alignment system and a system for controlling the same.

Motor vehicles, airplanes, busses, and various other means of transportation include seatbelts that are used to keep individuals, either passengers or operators, securely in their seats. In some cases, individuals struggle to properly engage their seatbelts.

SUMMARY

In one exemplary embodiment, a seatbelt is provided. The seatbelt including a receiver having an opening configured to receive a latch-plate, an extended pushbutton at least partially disposed within the receiver, and a magnet at least partially disposed within the extended pushbutton, wherein the magnet is configured to align the latch-plate with the opening.

In addition to the one or more features described herein the magnet is an electromagnet.

In addition to the one or more features described herein the seatbelt also includes a sensor configured to monitor an engagement status of the seatbelt.

In addition to the one or more features described herein the seatbelt also includes a controller configured to selectively activate the electromagnet based at least in part on the engagement status of the seatbelt.

In addition to the one or more features described herein the controller is configured to deactivate the electromagnet based on the engagement status of the seatbelt is engaged.

In addition to the one or more features described herein the controller is configured to activate the electromagnet based on the engagement status of the seatbelt being disengaged.

In addition to the one or more features described herein the seatbelt also includes a cover affixed to the receiver, wherein the cover partially encloses the extended pushbutton.

In addition to the one or more features described herein the extended pushbutton is configured to extend from the receiver by a first distance when the seatbelt is engaged and by a second distance, that is greater than the first distance, when the seatbelt is disengaged.

In one exemplary embodiment, a method for controlling a seatbelt having an electromagnetic alignment system is provided. The method includes determining whether a person is sitting in a seat having the seatbelt and determining an engagement status of the seatbelt. Based on a determination that the person is sitting in the seat and that the engagement status of the seatbelt is disengaged, the method includes activating an electromagnet disposed within an extended pushbutton of the electromagnetic alignment system. Based on a determination that the person is not sitting in the seat; the method includes deactivating the electromagnet. Based on a determination that the engagement status of the seatbelt is engaged, the method includes deactivating the electromagnet.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application, or uses. Various embodiments of the disclosure are described herein with reference to the related drawings. Alternative embodiments of the disclosure can be devised without departing from the scope of the claims. Various connections and positional relationships (e.g., over, below, adjacent, etc.) are set forth between elements in the following description and in the drawings. These connections and/or positional relationships, unless specified otherwise, can be direct or indirect, and the present disclosure is not intended to be limiting in this respect. Accordingly, a coupling of entities can refer to either a direct or an indirect coupling, and a positional relationship between entities can be a direct or indirect positional relationship.

Turning now to an overview of the aspects of the disclosure, embodiments of the disclosure include a seatbelt having a magnetic alignment system. In exemplary embodiments, the magnetic alignment system is configured to aid in the alignment of the seatbelt to make buckling a seatbelt as easy as possible, specifically for people with limited hand dexterity or range of motion. In exemplary embodiments, the magnetic alignment system includes a magnet that is integrated into the button of the buckle to attract the latch-plate to the correct plane of engagement allowing a user to simply push down in order to engage the seatbelt. In exemplary embodiments, the magnetic alignment system is configured to provide feedback to the user regarding the alignment of the latch-plate with the buckle without changing their line of sight. In exemplary embodiments, the magnet is disposed within the buckle such that it does not disrupt the regular operation of the buckle.

Figure 1A:
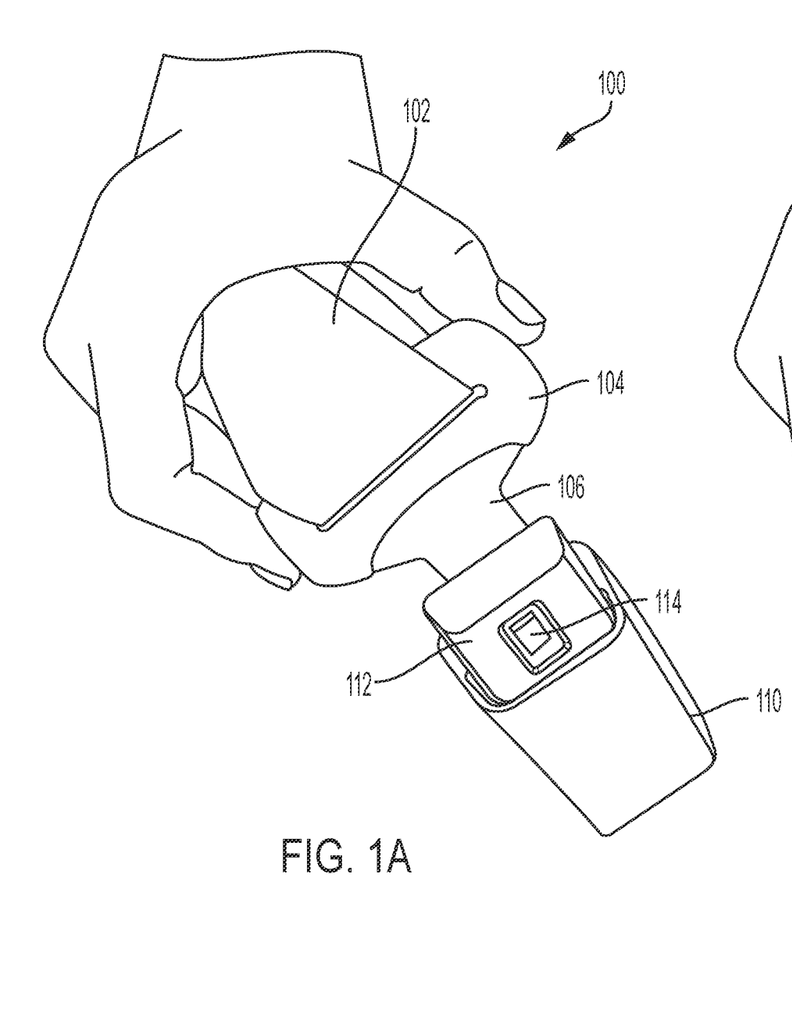
FIG. 1A is a schematic diagram illustrating a seatbelt having a magnetic alignment system in a disengaged state in accordance with an exemplary embodiment.
Figure 1B:
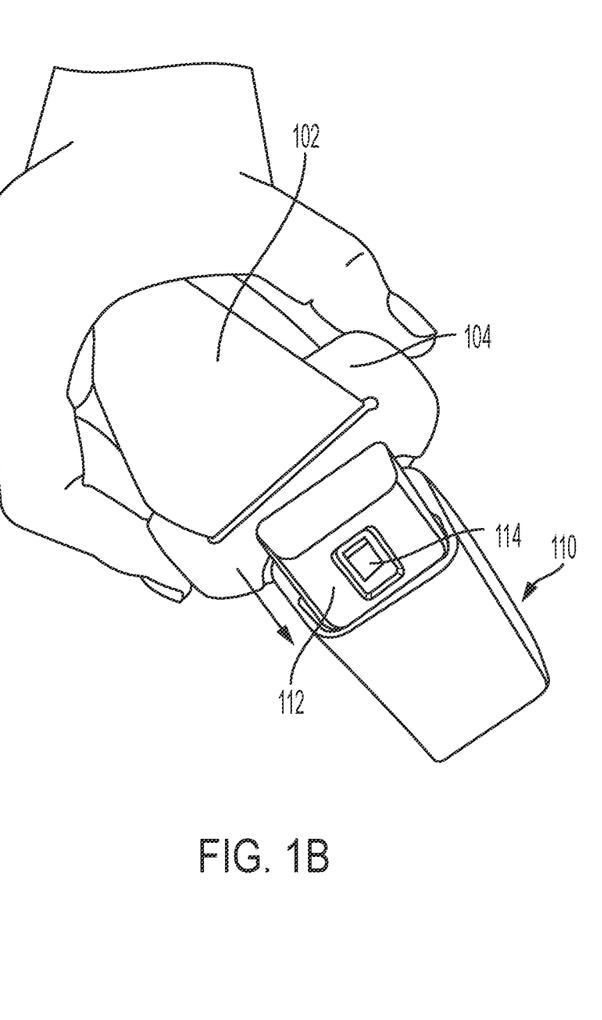
FIG. 1B is a schematic diagram illustrating a seatbelt having a magnetic alignment system in an engaged state in accordance with an exemplary embodiment.
Figure 1C:
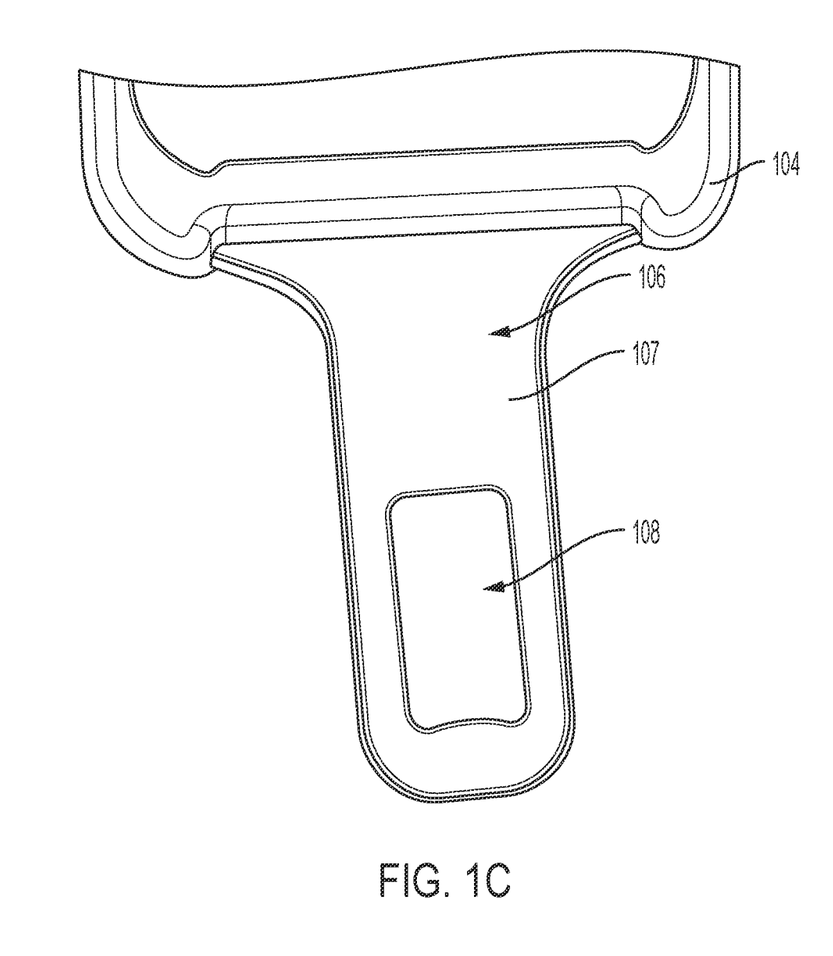
FIG. 1C is a schematic diagram illustrating an extended latch-plate for use with a seatbelt having a magnetic alignment system in accordance with an exemplary embodiment.
Figure 1D:
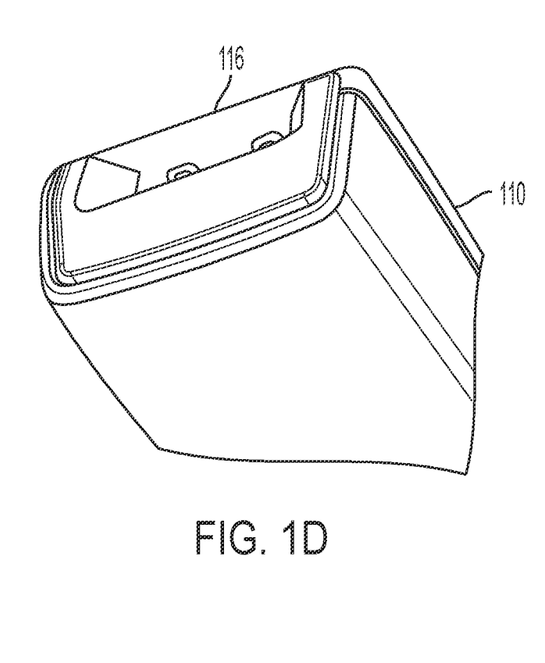
FIG. 1D is a schematic diagram illustrating a buckle of a seatbelt system in accordance with an exemplary embodiment.

Referring now to FIGS. 1A and 1B, schematic diagrams illustrating a seatbelt 100 having a magnetic alignment system in a disengaged state and an engaged state in accordance with an exemplary embodiment are respectively shown. As illustrated, the seatbelt 100 includes a handle 104 slidably disposed on a belt 102. The handle 104 includes a latch-plate 106 that is configured to be inserted into a receiver 110 to removably affix the latch-plate 106 into the receiver 110. In exemplary embodiments, the receiver 110 includes an extended pushbutton 112 that is configured to extend outside of the body of the receiver 110. The extended pushbutton 112 includes a magnet 114, which may be disposed within the extended pushbutton 112 or mounted to a surface of the extended pushbutton 112. In exemplary embodiments, the magnet 114 is configured to attract the latch-plate 106 to aid in the proper alignment of the latch-plate 106 with an opening 116 of the receiver 110, as shown in FIG. 1D.

In exemplary embodiments, the extended pushbutton 112 is configured to remain extended outside of the body of the receiver 110 when the seatbelt is in the engaged state, as best shown in FIG. 1B. In exemplary embodiments, the extended pushbutton 112 protruding outside of the body of the receiver makes it easier for users to disengage the seatbelt as the button is raised, thus preventing customers from having to dig down to locate the pushbutton to disengage the seatbelt. In exemplary embodiments, as shown in FIG. 1C, the latch-plate 106 includes an aperture 108 that is configured to receive a latch when placed inside of the receiver 110. In some embodiments, the latch-plate 106 also includes an extended body portion 107.

Figure 2:
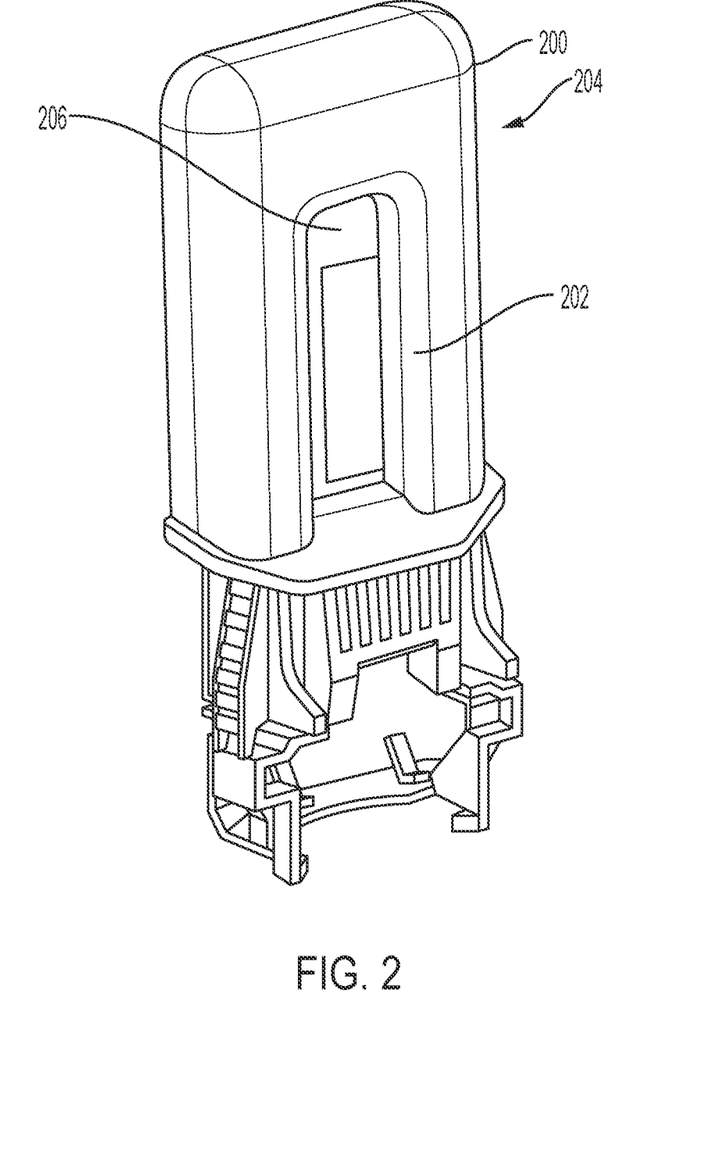
FIG. 2 a schematic diagram illustrating an extended pushbutton having an integrated magnet in accordance with another exemplary embodiment.

Referring now to FIG. 2, a schematic diagram illustrating an extended pushbutton 200 having an integrated magnet 202 in accordance with another exemplary embodiment is shown. In exemplary embodiments, the magnet 202 is formed into a body 204 of the pushbutton 200 such that the magnet 202 will not come into direct contact with the latch-plate during the operation of the seatbelt. In one embodiment, the body 204 includes a cavity 206 in which the magnet 202 is positioned. In exemplary embodiments, the strength of the magnet and the location of the magnet in the extended pushbutton 200 are selected such that magnet 202 will provide enough magnetic force to attract the latch-plate when it is in proximity, but not so much force that it would make disengaging the seatbelt difficult.

Figure 3A:
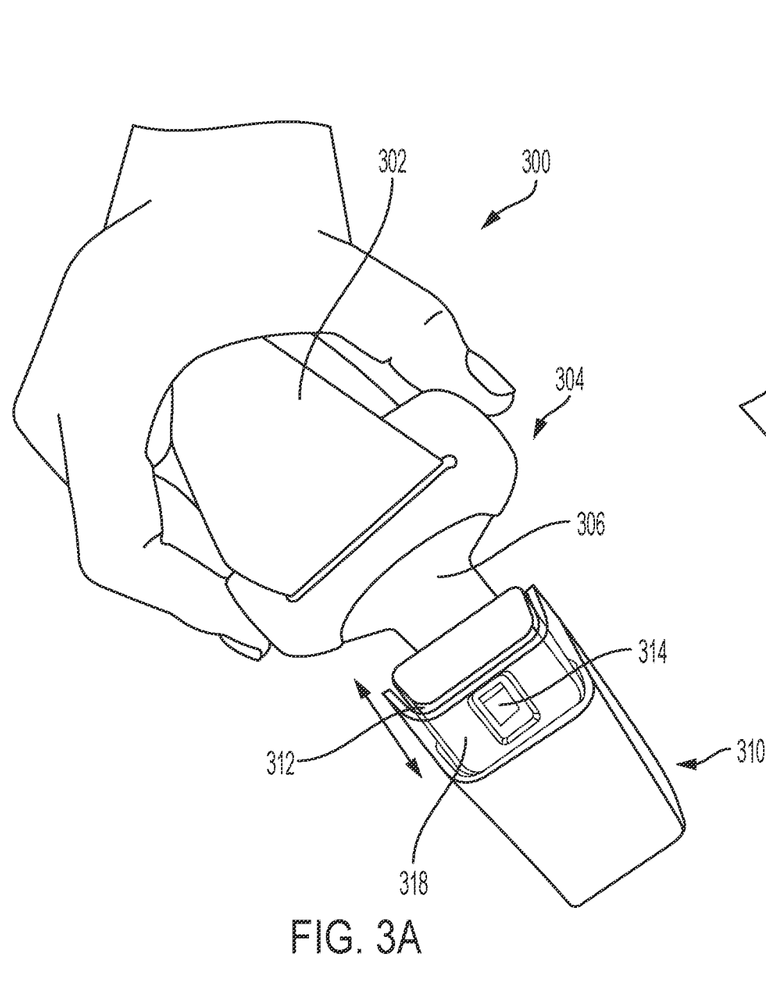
FIG. 3A is a schematic diagram illustrating a seatbelt having a magnetic alignment system in a disengaged state in accordance with another exemplary embodiment.
Figure 3B:
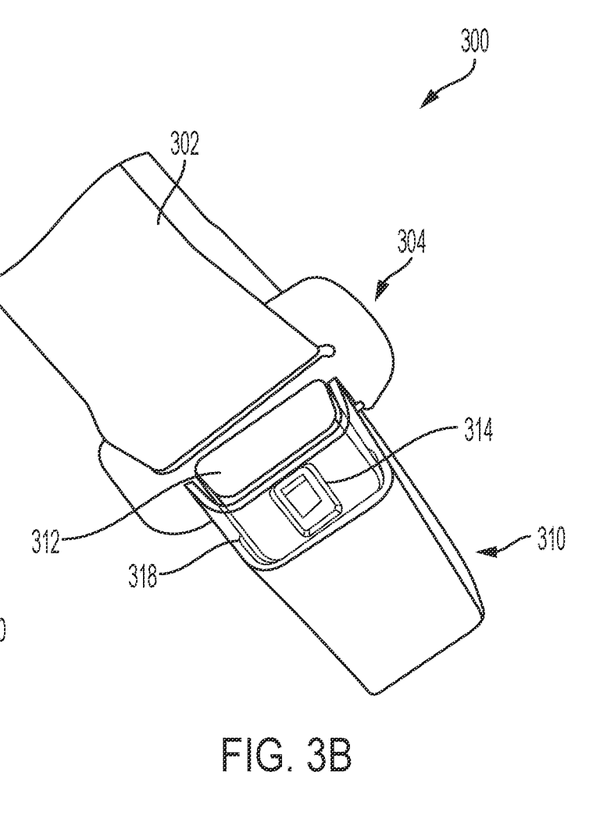
FIG. 3B is a schematic diagram illustrating a seatbelt having a magnetic alignment system in an engaged state in accordance with another exemplary embodiment.

Referring now to FIGS. 3A and 3B, schematic diagrams illustrating a seatbelt 300 having a magnetic alignment system in a disengaged state and an engaged state in accordance with an exemplary embodiment are respectively shown. As illustrated, the seatbelt 300 includes a handle 304 slidably disposed on a belt 302. The handle 304 includes a latch-plate 306 that is configured to be inserted into a receiver 310 to removably affix the latch-plate 306 into the receiver 310. In exemplary embodiments, the receiver 310 includes an extended pushbutton 312 that is configured to extend outside of the body of the receiver 310.

In exemplary embodiments, the receiver 310 also includes a cover 318 that substantially covers the front and side surfaces of the extended pushbutton 312. The cover 318 is configured to prevent accidental disengagement of the latch-plate 306 from the receiver 310 by incidental contact with the extended pushbutton 312. While the cover 318 extends over the front and side surfaces of the extended pushbutton 312, the cover 318 does not obstruct the latch-plate 306 from coming into contact with the rear surface of the extended pushbutton 312.

The extended pushbutton 312 includes a magnet 314, which may be disposed within the extended pushbutton 312 or mounted to a surface of the extended pushbutton 312. In exemplary embodiments, the magnet 314 is configured to attract the latch-plate 306 to aid in the proper alignment of the latch-plate 306 with an opening of the receiver 310.

Figure 4A:
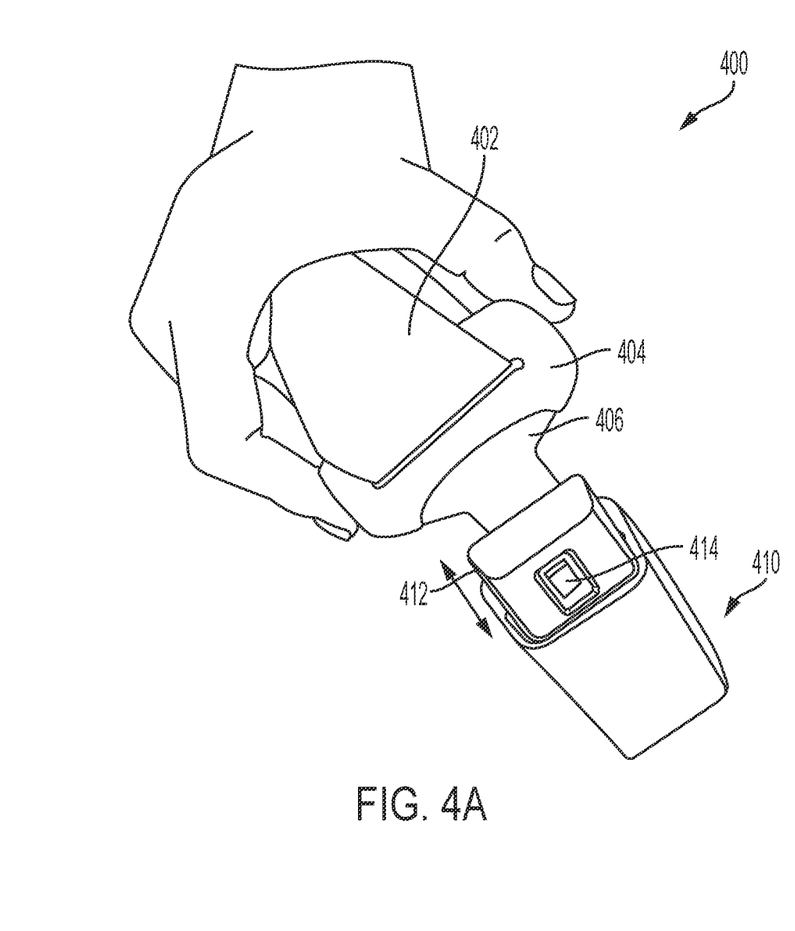
FIG. 4A is a schematic diagram illustrating a seatbelt having a magnetic alignment system in a disengaged state in accordance with a further exemplary embodiment.
Figure 4B:
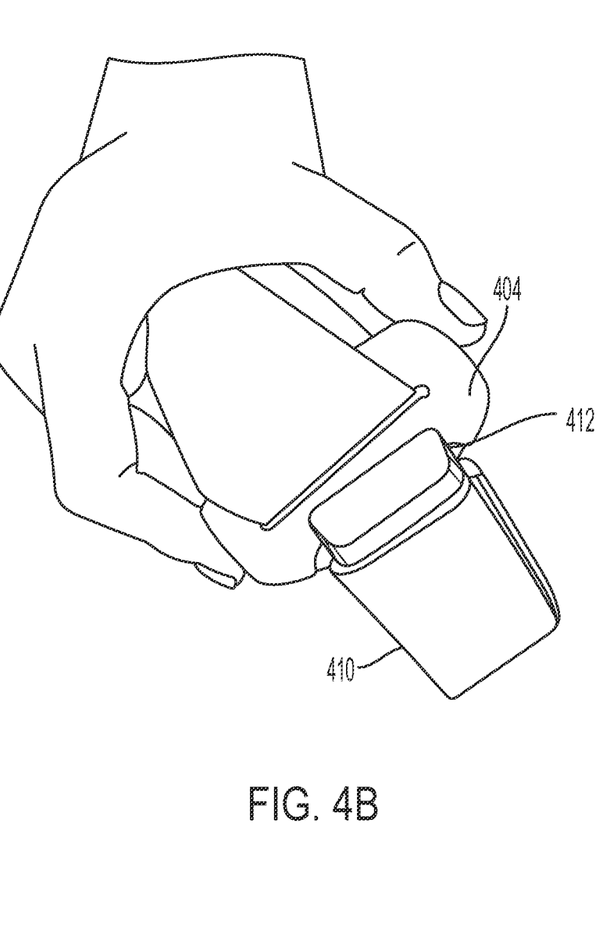
FIG. 4B is a schematic diagram illustrating a seatbelt having a magnetic alignment system in an engaged state in accordance with a further exemplary embodiment.

Referring now to FIGS. 4A and 4B, schematic diagrams illustrating a seatbelt 400 having a magnetic alignment system in a disengaged state and an engaged state in accordance with an exemplary embodiment are respectively shown. As illustrated, the seatbelt 400 includes a handle 404 slidably disposed on a belt 402. The handle 404 includes a latch-plate 406 that is configured to be inserted into a receiver 410 to removable affix the latch-plate 406 into the receiver 410. In exemplary embodiments, the receiver 410 includes an extended pushbutton 412 that is configured to extend outside of the body of the receiver 410, when the seatbelt is in a disengaged state.

The extended pushbutton 412 includes a magnet 414, which may be disposed within the extended pushbutton 412 or mounted to a surface of the extended pushbutton 412. In exemplary embodiments, the magnet 414 is configured to attract the latch-plate 406 to aid in the proper alignment of the latch-plate 406 with an opening of the receiver 410. In exemplary embodiments, once the latch-plate 406 is aligned with the extended pushbutton 412, both the latch-plate 406 and the extended pushbutton 412 are pressed into the body of the receiver 410 to engage the seatbelt locking mechanism. In these embodiments, the receiver 410 includes one or more springs (not shown) that are configured to push the extended pushbutton 412 into its extended position, shown in FIG. 4A, when the seatbelt is disengaged.

Figure 5:
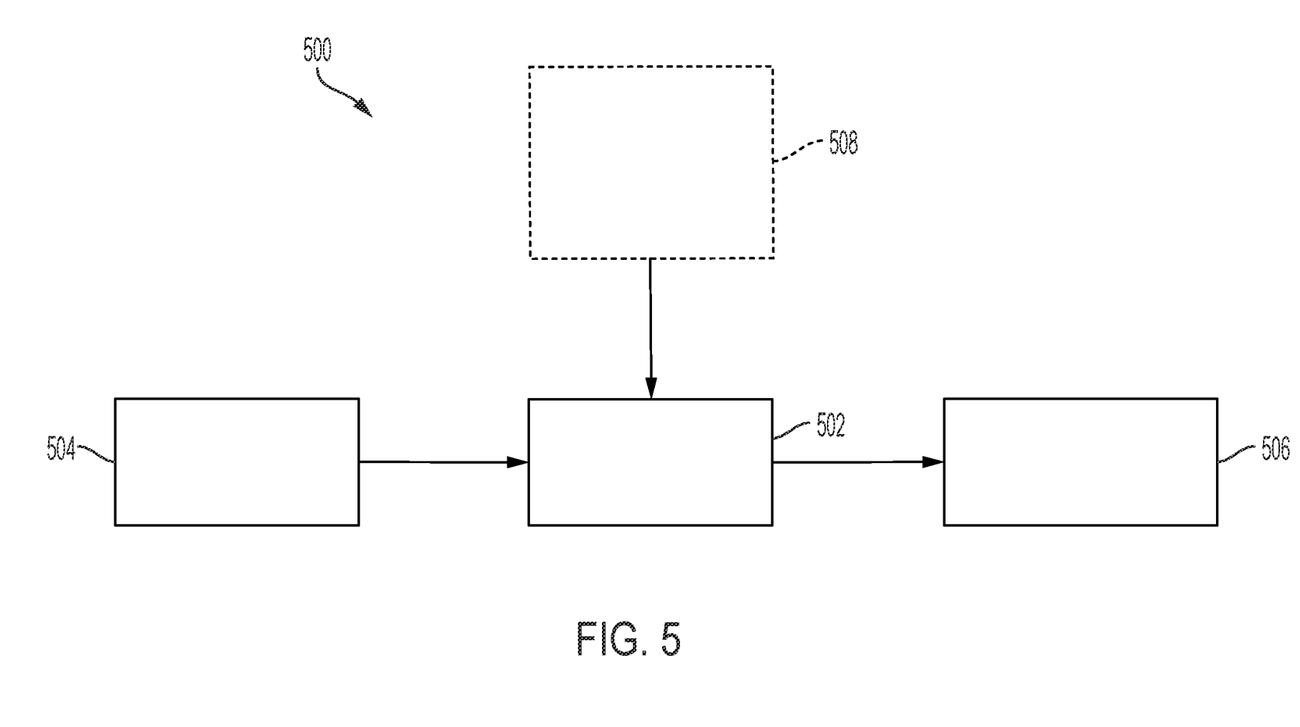
FIG. 5 is a block diagram of a system for a seatbelt having a magnetic alignment system in accordance with an exemplary embodiment.

In exemplary embodiments, the magnet used in the pushbutton is an electromagnet that can be selectively activated and deactivated. Referring now to FIG. 5, a block diagram of a system 500 for a seatbelt having a magnetic alignment system in accordance with an exemplary embodiment is shown. As illustrated, the system 500 includes a controller 502 that is in communication with one or more sensors 504 and an electromagnet 506. In some embodiments, the controller 502 is also configured to receive input from a user interface 508. In exemplary embodiments, the controller 502 is one of a general-purpose processor, a flexible programmable gate array (FPGA), an application-specific integrated circuit (ASIC), or the like.

In one embodiment, the one or more sensors 504 include sensors configured to determine the state of a seatbelt, (i.e., engaged or disengaged). In another embodiment, the one or more sensors 504 include sensors configured to determine the presence of an individual in a seat, (i.e., whether a seat is occupied or empty). The controller 502 is configured to selectively activate the electromagnet 506 based on the data received from the one or more sensors 504 and in some embodiments further based on input from the user interface 508.

In exemplary embodiments, the user interface 508 is configured to allow a user to manually activate and deactivate the electromagnet 506. In exemplary embodiments, the user interface 508 is further configured to allow a user to set up a user profile that contains one or more user preferences related to the automatic activation/deactivation of the electromagnet 506. In exemplary embodiments, the user preferences include a strength of the magnetic force created by the electromagnet 506 when activated and/or one or more criteria to be used in activating the electromagnet 506.

Figure 6:
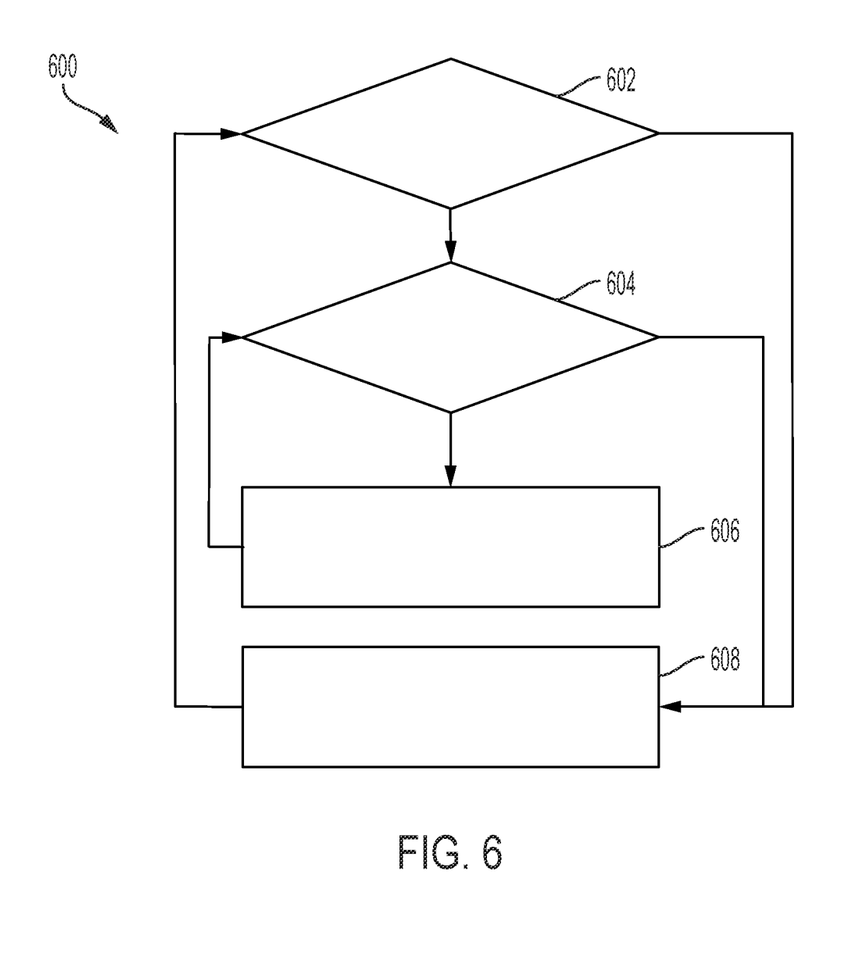
FIG. 6 is a flow diagram of a method for operating a control system for a seatbelt having an electromagnetic alignment system in accordance with an exemplary embodiment.

Referring now to FIG. 6, a flow diagram of a method for operating a control system for a seatbelt having an electromagnetic alignment system in accordance with an exemplary embodiment is shown. In exemplary embodiments, the method 600 may be performed by the controller 502 shown in FIG. 5. As shown at decision block 602, the method 600 includes determining whether there is a person sitting in a seat having the electromagnetic alignment system. Based on a determination that there is not a person sitting in the seat, the method 600 proceeds to block 608 and deactivates the electromagnet in the seatbelt pushbutton of the seat. Based on a determination that there is a person sitting in the seat, the method 600 proceeds to decision block 604 and determines if the seatbelt is engaged. Based on a determination that the seatbelt is engaged, the method 600 proceeds to block 608 and deactivates the electromagnet in the seatbelt pushbutton of the seat. Based on a determination that the seatbelt is not engaged, the method 600 proceeds to block 606 and activates the electromagnet in the seatbelt pushbutton of the seat.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, (i.e., one, two, three, four, etc.). The terms "a plurality" may be understood to include any integer number greater than or equal to two, (i.e., two, three, four, five, etc.). The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A seatbelt comprising:
   a receiver having an opening configured to receive a latch-plate;
   an extended pushbutton at least partially disposed within the receiver;
   a electromagnet at least partially disposed within the extended pushbutton;
   a sensor configured to monitor an engagement status of the seatbelt; and
   a controller configured to selectively activate the electromagnet based at least in part on the engagement status of the seatbelt,
   wherein the electromagnet is configured to align the latch-plate with the opening.

2. The seatbelt of claim 1, wherein the controller is configured to deactivate the electromagnet based on the engagement status of the seatbelt is engaged.

3. The seatbelt of claim 1, wherein the controller is configured to activate the electromagnet based on the engagement status of the seatbelt being disengaged.

4. The seatbelt of claim 1, further comprising a cover affixed to the receiver, wherein the cover partially encloses the extended pushbutton.

5. The seatbelt of claim 1, wherein the extended pushbutton is configured to extend from the receiver by a first distance when the seatbelt is engaged and by a second distance, that is greater than the first distance, when the seatbelt is disengaged.

6. A method for controlling a seatbelt having an electromagnetic alignment system, the method comprising:
   determining whether a person is sitting in a seat having the seatbelt;
   determining an engagement status of the seatbelt;
   based on a determination that the person is sitting in the seat and that the engagement status of the seatbelt is disengaged, activating an electromagnet disposed within an extended pushbutton of the electromagnetic alignment system;
   based on a determination that the person is not sitting in the seat; deactivating the electromagnet; and
   based on a determination that the engagement status of the seatbelt is engaged, deactivating the electromagnet.

7. A vehicle comprising:
a seatbelt comprising:
- a receiver having an opening configured to receive a latch-plate;
- an extended pushbutton at least partially disposed within the receiver;
- a electromagnet at least partially disposed within the extended pushbutton;
- a sensor configured to monitor an engagement status of the seatbelt; and
- a controller configured to selectively activate the electromagnet based at least in part on the engagement status of the seatbelt,
- wherein the electromagnet is configured to align the latch-plate with the opening.

8. The vehicle of claim 7, wherein the controller is configured to deactivate the electromagnet based on the engagement status of the seatbelt is engaged.

9. The vehicle of claim 7, wherein the controller is configured to activate the electromagnet based on the engagement status of the seatbelt being disengaged.

10. The vehicle of claim 7, wherein the seatbelt further comprises a cover affixed to the receiver, wherein the cover partially encloses the extended pushbutton.

11. The vehicle of claim 7, wherein the extended pushbutton is configured to extend from the receiver by a first distance when the seatbelt is engaged and by a second distance, that is greater than the first distance, when the seatbelt is disengaged.

* * * * *